US007432886B2

(12) United States Patent
Song et al.

(10) Patent No.: US 7,432,886 B2
(45) Date of Patent: Oct. 7, 2008

(54) ORGANIC ELECTROLUMINESCENT (EL) DISPLAY DEVICE AND METHOD FOR DRIVING THE SAME

(75) Inventors: June-Young Song, Yongin (KR); Kyoung-Soo Lee, Anyang (KR)

(73) Assignee: Samsung SDI Co., Ltd., Suwon-si (KR)

(*) Notice: Subject to any disclaimer, the term of this patent is extended or adjusted under 35 U.S.C. 154(b) by 465 days.

(21) Appl. No.: 10/391,369

(22) Filed: Mar. 18, 2003

(65) Prior Publication Data

US 2003/0201955 A1 Oct. 30, 2003

(30) Foreign Application Priority Data

Apr. 12, 2002 (KR) .............................. 2002-19932

(51) Int. Cl.

*G09G 3/30* (2006.01)
*G09G 3/32* (2006.01)
*G09G 5/00* (2006.01)
*G09G 5/10* (2006.01)
*G06F 3/038* (2006.01)

(52) U.S. Cl. ............................ 345/76; 345/77; 345/78; 345/79; 345/80; 345/81; 345/82; 345/204; 345/690

(58) Field of Classification Search ............. 345/76–82, 345/98, 100, 204, 690; 315/169.1, 169.03

See application file for complete search history.

(56) References Cited

U.S. PATENT DOCUMENTS 5,311,169 A * 5/1994 Inada et al. .................. 345/77

(Continued)

FOREIGN PATENT DOCUMENTS

CN 1278635 A 1/2001

(Continued)

OTHER PUBLICATIONS

English translation of Korean Patent Laid Open Publication 1999-0033178, Published on May 15, 1999, in the name of Seung-Jun Lee, 14 pgs (previously submitted in the IDS filed on Sep. 23, 2004.).

*Primary Examiner*—Sumati Lefkowitz
*Assistant Examiner*—Alexander S Beck
(74) *Attorney, Agent, or Firm*—Christie, Parker & Hale, LLP

(57) ABSTRACT

An organic EL display device for compensating for a reduction of the voltage between the gate and source of a driving transistor occurring due to a voltage drop of the source voltage caused by the resistance component of a power source line, and a method for driving the organic EL display device. The organic EL display device has a data driver for receiving digital image data and applying the digital image data and a data voltage corresponding to the position of a pixel circuit. The data driver outputs different data voltages depending on the position of the pixel circuit even when the same digital image data are received. When the driving transistor is a P-type transistor, the data driver applies a higher data voltage to a pixel circuit that is closer to an external voltage source than that applied to a farther one even when the same digital data are received. When the driving transistor is an N-type transistor, the data driver applies a lower data voltage to a pixel circuit that is closer to an external voltage source than that applied to a farther one even when the same digital data are received.

14 Claims, 4 Drawing Sheets

U.S. PATENT DOCUMENTS

| | | | | |
|---|---|---|---|---|
| 6,459,395 | B1 * | 10/2002 | Kida et al. | 341/126 |
| 6,542,138 | B1 * | 4/2003 | Shannon et al. | 345/76 |
| 6,909,442 | B2 * | 6/2005 | Hiyama et al. | 345/690 |
| 2002/0180718 | A1 * | 12/2002 | La | 345/204 |
| 2003/0085906 | A1 * | 5/2003 | Elliott et al. | 345/613 |
| 2004/0055963 | A1 * | 3/2004 | Toyozawa et al. | 210/744 |

FOREIGN PATENT DOCUMENTS

| | | | |
|---|---|---|---|
| EP | 1 061 497 | A1 | 12/2000 |
| JP | 2002072926 | A * | 3/2002 |
| KR | 1999-0033178 | | 5/1999 |

* cited by examiner

ORGANIC ELECTROLUMINESCENT (EL) DISPLAY DEVICE AND METHOD FOR DRIVING THE SAME

CROSS REFERENCE TO RELATED APPLICATION

This application claims priority to application Ser. No. 2002-0019932, filed in the Korean Intellectual Property Office on Apr. 12, 2002, the disclosure of which is incorporated hereinto by reference.

BACKGROUND OF THE INVENTION (a) Field of the Invention

The present invention relates to an organic electroluminescent (hereinafter, referred to as "EL") display device, and a method for driving the organic EL display device. More specifically, the present invention relates to an organic EL display device capable of compensating for a reduction of the voltage between the gate and source of a driving transistor that occurs due to a voltage drop of the source voltage caused by the resistance component of a power source line, and a method for driving the organic EL display device.

(b) Description of the Related Art

In general, an organic EL display device is a display device that electrically excites a fluorescent organic compound to emit light, and drives N×M organic luminescent cells to display an image. Typically the techniques for driving the organic luminescent cells include, the passive matrix method and the active matrix method using thin film transistors (TFTs).

Compared with the passive matrix method that uses positive and negative electrodes lying at right angles to each other and selectively drives the electrode lines, the active matrix method connects TFTs and capacitors to the individual ITO (Indium Tin Oxide) pixel electrodes to maintain a voltage through capacitance.

FIG. 1 is a circuit diagram of a conventional pixel circuit for driving an organic EL device using TFTs, in which one of N×M pixels is shown.

Referring to FIG. 1, a P-type driving transistor M1 is connected to the organic EL device OELD to supply a current for emitting light. The current of the driving transistor M1 is controlled by a data voltage applied through a P-type switching transistor M2. Between the source and gate of the transistor M1, a capacitor $C_{st}$ is connected for maintaining the applied voltage for a predetermined period of time. The gate of the transistor M2 is connected to the n-th scan line Scan[n], and the source of the transistor M2 is connected to the m-th data line Data[m].

Now, the operation of the above-constructed pixel circuit will be described. With a scanning signal applied to the gate of the switching transistor M2 to turn on the transistor M2, data voltage $V_{DATA}$ is applied to the gate (node A) of the driving transistor M1 via the data lines. As the data voltage $V_{DATA}$ is applied to the gate, the current flows to the organic EL device OELD via the transistor M1 to emit lights.

The current flowing to the organic EL device is given by the following equation:

$$I_{OELD} = \frac{\beta}{2}(V_{GS} - V_{TH})^2 = \frac{\beta}{2}(V_{DD} - V_{DATA} - V_{TH})^2 \quad \text{[Equation 1]}$$

In the above equation, $I_{OELD}$ is the current flowing to the organic EL device; $V_{GS}$ is the voltage between the source and gate of the transistor M1; $V_{DD}$ is the source voltage applied to the source of the transistor M1; $V_{TH}$ is the threshold voltage of the transistor M1; $V_{DATA}$ is the data voltage; and β is a constant value.

As can be seen from Equation 1, the current corresponding to the data voltage $V_{DATA}$ applied to the pixel circuit shown in FIG. 1 is sent to the organic EL device OELD, which then emits light. Here, the data voltage $V_{DATA}$ has a multilevel value in a predetermined range, for representing gradation.

According to the conventional pixel circuit, virtually all the source voltage $V_{DD}$ is applied to the source of a driving transistor M1 that is closely connected, via a power source line, to an external source outputting the source voltage $V_{DD}$. But a voltage $V_{DD'}$ that is lower than the source voltage due to the resistance component of the power source line is applied to a source of the driving transistor M1 that is connected far away from the external voltage source via the power source line.

This can be described as follows in further detail with reference to FIGS. 2 and 3.

In the pixel circuit of FIG. 2, it is assumed that an external power source (not shown) is positioned adjacent to the first row of the pixel circuit.

In FIG. 2, the source voltage $V_{DD}$ is applied directly to the driving transistor M1 of the pixel circuit in the first row, and, via a resistance $R_p$, to the driving transistor of the pixel circuit in the n-th row.

Assuming that data voltage $V_1$ is applied to the gate of the driving transistor of the pixel circuit in the first row and data voltage $V_2$ is applied to the gate of the driving transistor of the pixel circuit in the n-th row, the driving transistor M1 is turned on as shown in the equivalent circuit diagram of FIG. 3.

As shown in FIG. 3, the voltage $V_{DD}$ is applied to the source (denoted by 'A') of the driving transistor of the pixel circuit in the first row, but the voltage $V_{DD'}$ that is lower than $V_{DD}$ is applied to the source (denoted by 'B') of the driving transistor of the pixel circuit in the n-th row due to a voltage drop caused by the resistance $R_p$.

Accordingly, when the same data voltage is applied in order to represent the same gradation in the first and n-th rows, i.e., $V_1=V_2$, the voltage $V_{DD}$ applied to the source of the driving transistor in the first row differs from the voltage $V_{DD'}$ applied to the source of the driving transistor in the n-th row. Hence a current of a different magnitude flows to the organic EL device as can be seen from Equation 1. Thus the conventional organic EL display device exhibits different gradations according to the position of the pixel even with the same data voltage, and therefore it has difficulty in accurately representing gradation.

Particularly, the difference of the source voltage caused by the resistance component of the power source line becomes greater with an increase in the distance from the external voltage source, and, for a high resolution (greater than SVGA) organic EL display device, a current of up to several amperes flows to the whole panel during a full white driving operation, resulting in a deterioration of the luminance by scores of grays.

SUMMARY OF THE INVENTION

An embodiment of the present invention may be used to solve the problems with the prior art and to provide an organic EL display device capable of compensating for a reduction of the voltage between the gate and source of a driving transistor occurring due to a voltage drop of the source voltage caused by the resistance component of a power source line, and a method for driving the organic EL display device.

In one embodiment of the present invention, there is provided an organic EL display device including: an organic EL panel comprising a plurality of data lines for transferring a data voltage representing a picture signal, a plurality of scan lines for transferring a scanning signal, and a pixel circuit formed by a plurality of pixels defined by the data and scan lines, the pixel circuit having an organic EL device and a driving transistor for driving the organic EL device; a scan driver for selectively applying the scanning signal to the scan lines; and a data driver for receiving digital image data and applying the digital image data and a data voltage corresponding to the position of the pixel circuit to the data lines.

The data driver outputs different data voltages depending on the position of the pixel circuit even when the same digital image data are received. More specifically, when the driving transistor is a P-type transistor, the data driver applies a higher data voltage to a pixel circuit that is closer to an external voltage source than that applied to a farther one even when the same digital data are received. Otherwise, when the driving transistor is an N-type transistor, the data driver applies a lower data voltage to a pixel circuit that is closer to an external voltage source than that applied to a farther one even when the same digital data are received.

In one embodiment of the present invention, there is provided an apparatus for driving an organic EL display device, which includes a plurality of data lines for transferring a data voltage representing a picture signal, a plurality of scan lines for transferring a scanning signal, and a pixel circuit formed by a plurality of pixels defined by the data and scan lines and having an organic EL device and a driving transistor for driving the organic EL device. The apparatus includes: a scan driver for selectively applying the scanning signal to the scan lines; a data driver for receiving RGB data as digital image data, and applying the digital image data and a data voltage corresponding to the position of the pixel circuit to the data lines; a graphic controller for generating the RGB data inherently or based on a picture signal that is externally applied; and a timing controller for generating horizontal and vertical sync signals from the RGB data, and sending the generated horizontal and vertical sync signals to the scan driver and sending the horizontal and vertical sync signals and the received RGB data to the data driver.

The data driver includes: a counter for detecting frame start information from the vertical sync signal and then counting the horizontal sync signal to output position data determining a scan line corresponding to a pixel circuit to which the RGB data are applied; a reference voltage adjuster for receiving the position data, and outputting a reference voltage corresponding to the position data; a voltage divider circuit comprising a plurality of resistances connected in series between a source voltage and the reference voltage; a switching section for selecting one of contact voltages each formed between the resistances of the voltage divider circuit; and a switch controller for receiving the horizontal and vertical sync signals and the RGB data, and controlling a switching operation of the switching section to select one contact voltage corresponding to the RGB data.

In one embodiment of the present invention, there is provided a method for driving an organic EL display device which includes a plurality of data lines for transferring a data voltage representing a picture signal, a plurality of scan lines for transferring a scanning signal, and a pixel circuit formed by a plurality of pixels defined by the data and scan lines and having an organic EL device and a driving transistor for driving the organic EL device. The method including: detecting the position of the pixel circuit from RGB data as digital image data; and (b) applying the RGB data and a data voltage corresponding to the position of the pixel circuit to the data lines.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, as will be realized, the disclosed embodiment of the invention is capable of modification in various obvious respects, all without departing from the invention. Accordingly, the drawings and description are to be regarded as illustrative in nature, and not restrictive.

Figure 4:
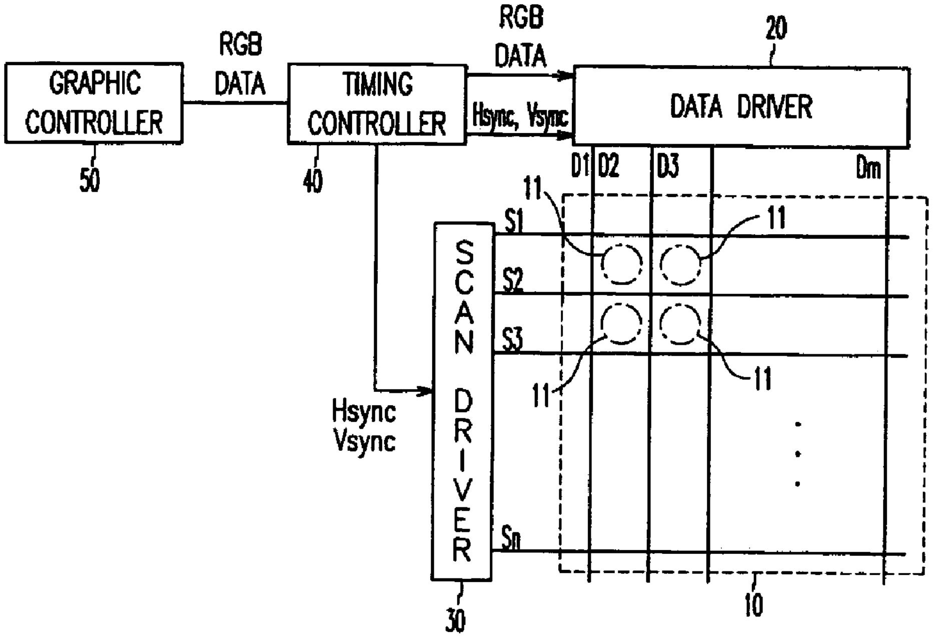
FIG. 4 is a diagram of an organic EL display device in accordance with one embodiment of the present invention.

FIG. 4 is a diagram showing an organic EL display device in accordance with an embodiment of the present invention.

As shown in FIG. 4, the organic EL display device according to an embodiment of the present invention comprises an organic EL display panel 10, a data driver 20, a scan driver 30, a timing controller 40, and a graphic controller 50.

The organic EL display panel 10 comprises a plurality of data lines $D_1$, $D_2$, $D_3$, . . . and $D_m$ for transferring a data voltage representing picture signals, a plurality of scan lines $S_1$, $S_2$, $S_3$, . . . and $S_n$ for transferring scanning signals, and a pixel circuit 11 formed by a plurality of pixels each defined by the data and scan lines.

Figure 1:
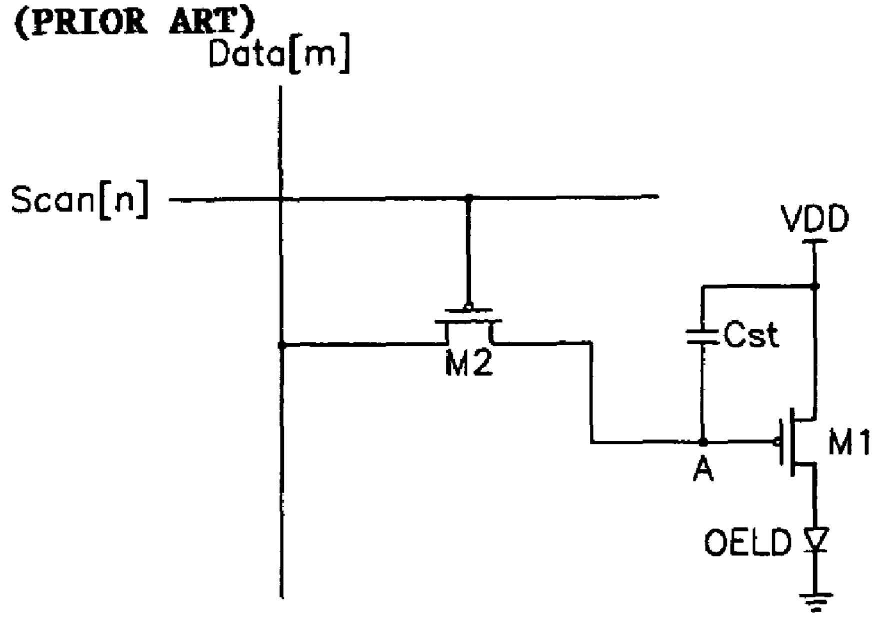
FIG.1 (PRIOR ART)
FIG. 1 is a circuit diagram of a conventional pixel circuit for driving an organic EL device.
Figure 2:
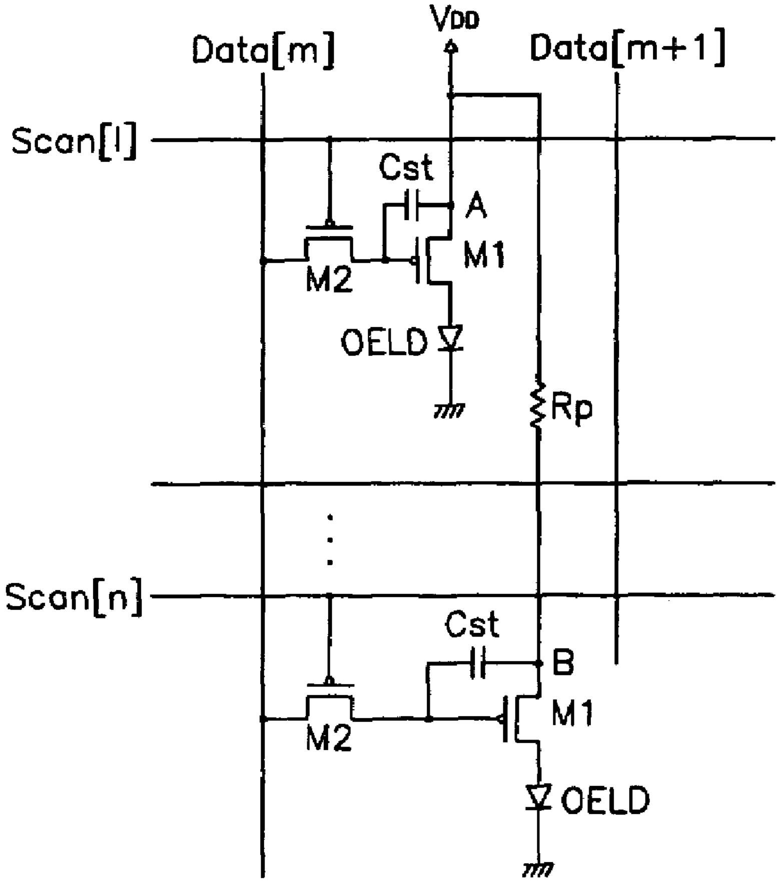
FIG.2 (PRIOR ART)
FIG. 2 is a circuit diagram of a conventional pixel circuit, in which the resistance component of a power source line is considered.
Figure 3:
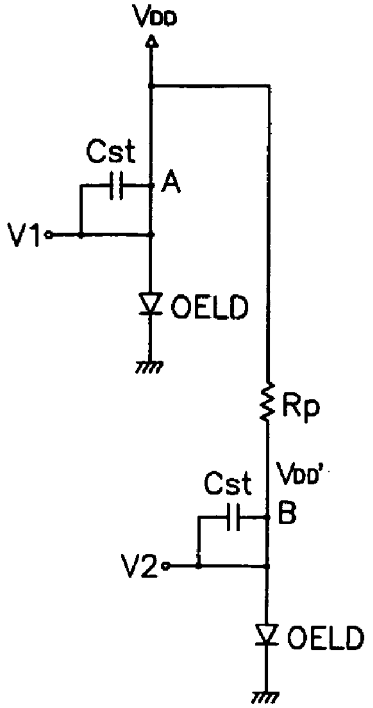
FIG.3 (PRIOR ART)
FIG. 3 is a diagram explaining the driving operation of the pixel circuit shown in FIG. 2.
Figure 5:
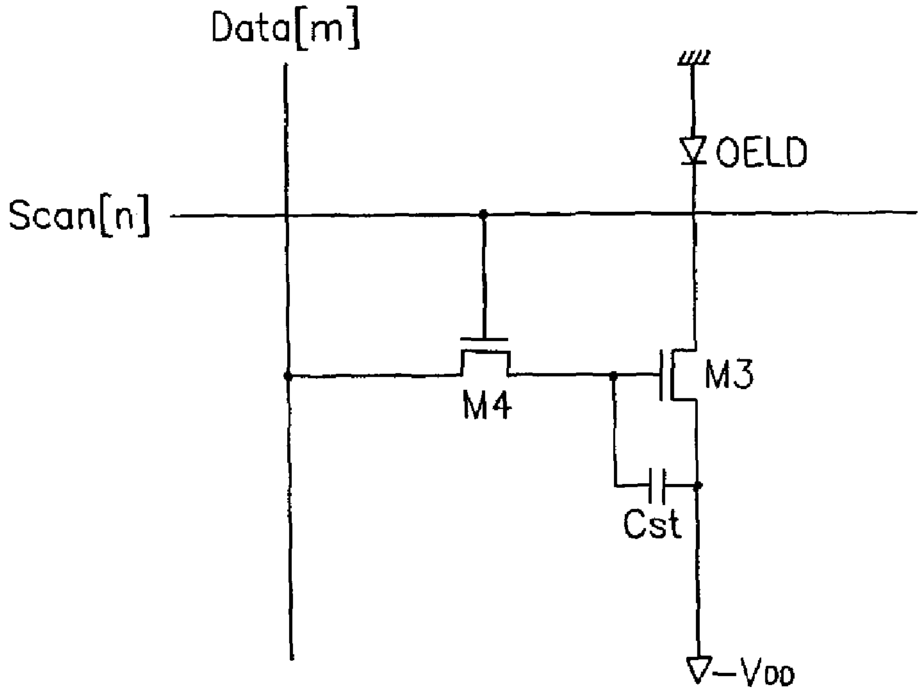
FIG. 5 is a diagram of a pixel circuit embodied with an N-type driving transistor.

The pixel circuit 11 may comprise, as shown in FIG. 1, an organic EL device OELD, a P-type driving transistor M1, a switching transistor M2, and a capacitor $C_{st}$. Alternatively, the pixel circuit 11 may comprise, as shown in FIG. 5, an organic EL device OELD, an N-type driving transistor M3, a switching transistor M4, and a capacitor $C_{st}$.

The driving transistors M1 and M3 are connected to the organic EL device OELD to supply a current for emitting lights. The currents of the driving transistors M1 and M3 are controlled by the data voltage applied through the switching transistors M2 and M4. The capacitor $C_{st}$ for maintaining the applied voltage for a predetermined period of time is connected between the source and gate of the transistors M1 and M3.

The graphic controller 50 generates digital image data, i.e., RGB data, inherently or based on picture signals that are externally received.

The timing controller 40 generates horizontal sync signals $H_{sync}$ and vertical sync signals $V_{sync}$ from the RGB data to output the sync signals $V_{sync}$ and $H_{sync}$ to the scan driver 30, or to output the sync signals $H_{sync}$ and $V_{sync}$ and the RGB data to the data driver 20.

The method for generating horizontal sync signals $H_{sync}$ and vertical sync signals $V_{sync}$ from the RGB data is well known to those skilled in the art and will not be described herein.

The data driver 20 receives the sync signals Hsync and Vsync and the RGB data from the timing controller 40 generates a compensated data voltage with respect to scan lines in order to compensate for a reduction of the voltage between the gate and source of the driving transistors caused by a voltage drop of the power source line, and applies the compensated data voltage to the data lines. Here, the data driver 20 according to the embodiment of the present invention outputs different data voltages depending on the position of the pixel circuit, even when the same RGB data is received.

As will be described later, when with the same RGB data are received, the data driver 20 applies a higher data voltage to a pixel circuit that is closer to the external power source when using a P-type driving transistor, as shown in FIG. 1, or a lower data voltage to a pixel circuit that is closer to the external power source when using an N-type driving transistor, as shown in FIG. 5.

The scan driver 30 sequentially applies, to the plural scan lines, the scanning signals in synchronization with the sync signals received from the timing controller 40.

Figure 6:
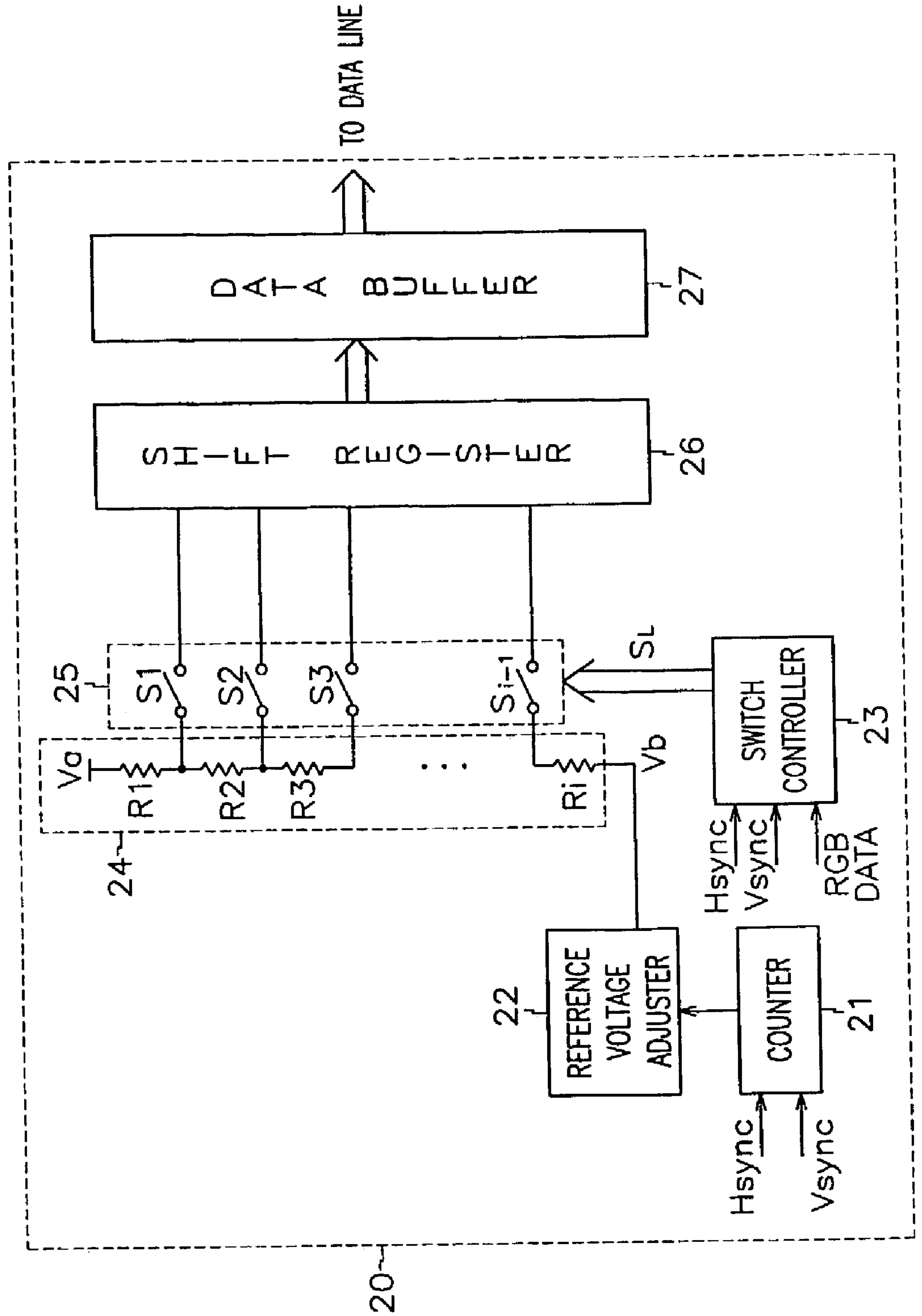
FIG. 6 is a diagram of a data driver in accordance with one embodiment of the present invention.

FIG. 6 is a detailed diagram of the data driver 20 in accordance with an embodiment of the present invention.

As shown in FIG. 6, the data driver 20 according to the embodiment of the present invention comprises a counter 21, a reference voltage adjuster 22, a voltage divider circuit 24, a switching section 25, a switch controller 23, a shift register 26, and a data buffer 27.

The counter 21 receives the vertical sync signal $V_{sync}$ and the horizontal sync signal $H_{sync}$ and outputs information about the scan line corresponding to the pixel circuit to which the RGB data will be applied. Namely, the counter 21 detects frame start information from the vertical sync signal $V_{sync}$ and counts the horizontal sync signals $H_{sync}$ to output the position data that determines a scan line corresponding to the pixel circuit to which the RGB data will be applied.

The reference voltage adjuster 22 receives the position data from the counter 21 and outputs a reference voltage $V_b$ corresponding to the position data. The reference voltage is to compensate for a reduction of the voltage between the gate and source of the driving transistor caused by a voltage drop of the power source line. More specifically, the reference voltage adjuster 22 outputs a lower reference voltage to a pixel circuit that is farther from the external power source when using a P-type driving transistor, as shown in FIG. 1, or a higher data voltage to a pixel circuit that is farther from the external power source when using an N-type driving transistor, as shown in FIG. 5.

The voltage divider circuit 24 comprises i resistances $R_1$, $R_2$, . . . and $R_i$ connected in series between a source voltage $V_a$ and the reference voltage $V_b$ of the reference voltage adjuster 22. Contact voltages each formed between the resistances provide the respective gradation voltage levels.

The contact voltage $V_x$ between the resistances is calculated by the following Equation 2:

$$V_x = \frac{R_{x+1} + R_{x+2} + \ldots + R_{i-1} + R_i}{R_1 + R_2 + \ldots + R_{i-1} + R_i}(V_a - V_b) + V_b \qquad \text{[Equation 2]}$$

-continued $$= \frac{(R_{x+1} + R_{x+2} + \ldots + R_{i-1} + R_i)V_a + (R_1 + R_2 + \ldots + R_{x-1} + R_x)V_b}{R_1 + R_2 + \ldots + R_{i-1} + R_i}$$

As is apparent from Equation 2, the contact voltage $V_x$ of the voltage divider circuit 24 becomes higher as the $V_b$ increases, i.e., the pixel circuit is nearer to the external power voltage source. The switching section 25 selects one of the contact voltages each formed between the resistances and sends the selected contact voltage to the shift register.

According to the voltage divider circuit shown in FIG. 6, the one voltage $V_a$ is constant (referred to as "source voltage" in FIG. 6) and the other voltage $V_b$ output from the reference voltage adjuster is variable depending on the position of the pixel circuit. Alternatively, the both voltages $V_a$ and $V_b$ can be output from the reference voltage adjuster and controlled to be variable.

The switch controller 23 receives the horizontal sync signals $H_{sync}$, the vertical sync signals $V_{sync}$, and the RGB data, and controls the switching operation of the switching section 25 to select one contact voltage corresponding to the RGB data.

The shift register 26 sequentially shifts the selected contact voltage, and after shifting all the data voltages to be applied to the respective data lines, sends the voltages to the data buffer.

The data buffer 27 applies the data voltage, stored in synchronization with control signals (not shown), to the data lines.

According to one embodiment of the present invention, in order to compensate for a reduction of the voltage between the gate and source of the driving transistor due to a voltage drop of the power source line, a lower reference voltage is output to a pixel circuit that is farther from the external power voltage source than that applied to a closer one in the case of a P-type driving transistor. Thus even when RGB data of a same gradation level are output from the graphic controller, the embodiment of the present invention solves the problem regarding a reduction of the voltage difference between the gate and source of the driving transistor caused by a voltage drop of the power source line, since the data voltage applied to a pixel circuit far from the external power voltage source is lower than the data voltage applied to a pixel circuit that is adjacent to the external power voltage source.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

For example, although the driving transistor of a pixel circuit has the same conductivity type as the switching transistor in the embodiment of the present invention, the transistors may differ from each other in the conductivity type.

As described above, according to one embodiment of the present invention, the reference voltage applied to the voltage divider circuit generating the data voltage is variable depending on the position of the pixel circuit, thereby compensating for a reduction of the voltage between the gate and source of the driving transistor occurring due to a drop of the source voltage caused by the resistance component of the power source line.

What is claimed is:

1. An organic electroluminescent display device comprising:

an organic electroluminescent panel comprising a plurality of data lines for transferring a data voltage corresponding to digital image data, a plurality of scan lines for transferring a scanning signal, and a plurality of pixel circuits defined by the data lines and the scan lines, each of the pixel circuits having an organic electroluminescent device and a driving transistor for driving the organic electroluminescent device;

a scan driver for selectively applying the scanning signal to the scan lines; and a data driver for receiving the digital image data and applying the data voltage corresponding to the digital image data to the data lines, the data driver comprising a voltage divider including a plurality of resistances connected in series between a source voltage and a reference voltage, the data voltage for a pixel circuit selected from among contact voltages formed between the resistances, wherein the data driver adjusts a magnitude of the data voltage by adjusting a magnitude of the reference voltage in accordance with a location of a corresponding one of the pixel circuits to compensate for a voltage change between a gate and a source of the driving transistor, the voltage change being caused by a voltage drop along a power source line for providing a driving current to the driving transistor.

2. The organic electroluminescent display device as claimed in claim 1, wherein the driving transistor is a P-type transistor, and wherein the data voltage applied to one of the pixel circuits closer to an external voltage source for the power source line is higher than the data voltage applied to a farther one of the pixel circuits when same digital image data are received.

3. The organic electroluminescent display device as claimed in claim 1, wherein the driving transistor is an N-type transistor, and wherein the data voltage applied to one of the pixel circuits closer to an external voltage source is lower than the data voltage applied to a farther one of the pixel circuits when same digital image data are received.

4. The organic electroluminescent display device as claimed in claim 1, further comprising:

a graphic controller for generating the digital image data, which is RGB data; and a timing controller for generating horizontal and vertical sync signals from the RGB data, and sending the horizontal and vertical sync signals to the scan driver and sending the horizontal and vertical sync signals and the RGB data to the data driver.

5. An apparatus for driving an organic electroluminescent display device including a plurality of data lines for transferring a data voltage corresponding to RGB data, a plurality of scan lines for transferring a scanning signal, and a plurality of pixel circuits defined by the data lines and the scan lines, each of the pixel circuits having an organic electroluminescent device and a driving transistor for driving the organic electroluminescent device, the apparatus comprising;

a scan driver for selectively applying the scanning signal to the scan lines;

a data driver for receiving the RGB data and applying the data voltage corresponding to the RGB data to the data lines, the data driver comprising a voltage divider including a plurality of resistances in series between a source voltage and a reference voltage, the data voltage for a pixel circuit selected from among contact voltages formed between the resistances, wherein the data driver adjusts a magnitude of the data voltage by adjusting a magnitude of the reference voltage in accordance with a location of a corresponding one of the pixel circuits to compensate for a voltage change between a gate and a source of the driving transistor, the voltage change being caused by a voltage drop along a power source line for providing a driving current to the driving transistor;

a graphic controller for generating the RGB data independently or based on a picture signal received by the organic electroluminescent display device; and a timing controller for generating horizontal and vertical sync signals from the RGB data, and sending the horizontal and vertical sync signals to the scan driver and sending the horizontal and vertical sync signals and the RGB data to the data driver.

6. The apparatus as claimed in claim 5, wherein the driving transistor is a P-type transistor and the data driver applies a higher data voltage to one of the pixel circuits closer to an external voltage source than to another one of the pixel circuits farther from the external voltage source when RGB data are received.

7. The apparatus as claimed in claim 5, wherein the driving transistor is an N-type transistor, the data driver applying a lower data voltage to one of the pixel circuits closer to an external voltage source than to another one of the pixel circuits farther from the external voltage source when same RGB data are received.

8. A method for driving an organic electroluminescent display device, the organic electroluminescent display device including a plurality of data lines for transferring a data voltage corresponding to RGB data, a plurality of scan lines for transferring a scanning signal, and a plurality of pixel circuits defined by the data lines and the scan lines, each of the pixel circuits having an organic electroluminescent device and a driving transistor for driving the organic electroluminescent device, the method comprising;

utilizing the RGB data for locating a position of one of the pixel circuits receiving the scanning signal;

generating a divided voltage by dividing a difference between source voltage and a reference voltage;

generating a compensated data voltage from the divided voltage with respect to the scan lines by adjusting a magnitude of the reference voltage to compensate for a voltage change between a gate and a source of the driving transistor, the voltage change being caused by a voltage drop along a power source line for providing power to the pixel circuits, the compensated data voltage having a magnitude adjusted for the voltage drop; and applying the compensated data voltage to the data lines.

9. The method as claimed in claim 8, wherein the driving transistor is a P-type transistor, and wherein applying the compensated data voltage to the data lines comprises applying a higher data voltage to one of the pixel circuits closer to the external source than to another one of the pixel circuits farther from the external source for same RGB data.

10. The method as claimed in claim 8, wherein the driving transistor is an N-type transistor, and wherein applying the compensated data voltage to the data lines comprises applying a lower data voltage to one of the pixel circuits closer to the external source than another one of the pixel circuits farther from the external source for same RGB data.

11. The method as claimed in claim 9 or 10, wherein the utilizing the RGB data for locating a position of one of the pixel circuits receiving the scanning signal comprises:

generating horizontal and vertical sync signals from the RGB data; and detecting frame start information from the vertical sync signal and then counting the horizontal sync signals to obtain position data determining one of the scan lines corresponding to one of the pixel circuits receiving the RGB data.

12. A method for driving an organic electroluminescent display device, the organic electroluminescent display device including a plurality of data lines for transferring a data voltage representing a picture signal, a plurality of scan lines for transferring a scanning signal, and a plurality of pixel circuits defined by the data and scan lines, each of the pixel circuits having an organic electroluminescent device and a driving transistor for driving the organic electroluminescent device, the method comprising:

(a) utilizing RGB data as digital image data for locating a position of one of the pixel circuits receiving the scanning signal; and (b) applying a compensated data voltage to the data lines, the compensated data voltage corresponding to a position of a corresponding one of the pixel circuits along the plurality of data lines, the compensated data voltage compensating for a voltage drop of the data voltage along a power source line providing power to the pixel circuits from an external voltage source, wherein the step (b) comprises:

receiving position data output in the step (a), and outputting a reference voltage corresponding to the position data; and selecting one of contact voltages each formed between the resistances connected in series between a source voltage and the reference voltage.

13. An organic electroluminescent display device comprising:

an organic electroluminescent panel comprising a plurality of data lines for transferring a data voltage representing a picture signal, a plurality of scan lines for transferring a scanning signal, and a plurality of pixels defined by the data lines and scan lines, each of the pixels including a pixel circuit having an organic electroluminescent device and a driving transistor for driving the organic electroluminescent device;

a scan driver for selectively applying the scanning signal to the scan lines;

a data driver for receiving digital image data and applying a data voltage corresponding to a position of the pixel circuit to the data lines;

a graphic controller for generating RGB data as the digital image data; and a timing controller for generating horizontal and vertical sync signals from the RGB data, and sending the generated horizontal and vertical sync signals to the scan driver and sending the horizontal and vertical sync signals and the received RGB data to the data driver, wherein the data driver comprises:

a counter circuit for detecting frame start information from the vertical sync signal and for counting the horizontal sync signals to output position data determining one of the scan lines corresponding to the pixel circuit to which the RGB data is applied;

a reference voltage adjuster for receiving the position data and sending a reference voltage corresponding to the position data;

a voltage divider circuit comprising a plurality of resistances connected in series between a source voltage and the reference voltage;

a switching section for selecting one of contact voltages each formed between the resistances of the voltage divider circuit; and a switch controller for receiving the horizontal and vertical sync signals and the RGB data, and controlling a switching operation of the switching section to select one contact voltage corresponding to the RGB data.

14. An apparatus for driving an organic electroluminescent display device including a plurality of data lines for transferring a data voltage representing a picture signal, a plurality of scan lines for transferring a scanning signal, and pixel circuit formed by a plurality of pixels defined by the data and scan lines, each of the pixels including a pixel circuit having an organic electroluminescent device and a driving transistor for driving the organic electroluminescent device, the apparatus comprising:

a scan driver for selectively applying the scanning signal to the scan lines;

a data driver for receiving RGB data as digital image data, and applying a data voltage corresponding to a position of the pixel circuit to the data lines;

a graphic controller for generating the RGB data inherently or based on the picture signal that is externally applied; and a timing controller for generating horizontal and vertical sync signals from the RGB data, and sending the generated horizontal and vertical sync signals to the scan driver and sending the horizontal and vertical sync signals and the RGB data to the data driver, wherein the driving transistor is a P-type transistor and the data driver applies a higher data voltage to one of the pixels that is closer to an external voltage source than that applied to a farther one of the pixels when same digital data are received, and wherein the data driver comprises:

a counter for detecting frame start information from the vertical sync signal and then counting the horizontal sync signals to output position data determining one of the scan lines corresponding to the pixel circuit to which the RGB data are applied;

a reference voltage adjuster for receiving the position data, and outputting a reference voltage corresponding to the position data;

a voltage divider circuit comprising a plurality of resistances connected in series between a source voltage and the reference voltage;

a switching section for selecting one of contact voltages each formed between the resistances of the voltage divider circuit; and a switch controller for receiving the horizontal and vertical sync signals and the ROB data, and controlling a switching operation of the switching section to select one contact voltage corresponding to the RGB data.

* * * * *

UNITED STATES PATENT AND TRADEMARK OFFICE

CERTIFICATE OF CORRECTION

PATENT NO. : 7,432,886 B2
APPLICATION NO. : 10/391369
DATED : October 7, 2008
INVENTOR(S) : June-Young Song It is certified that error appears in the above-identified patent and that said Letters Patent is hereby corrected as shown below:

| | |
|---|---|
| Column 8, line 40, Claim 8 | Delete “between source”,<br>Insert --between a source-- |
| Column 10, line 57, Claim 14 | Delete “ROB”,<br>Insert --RGB-- |

Signed and Sealed this

Seventeenth Day of February, 2009

JOHN DOLL
*Acting Director of the United States Patent and Trademark Office*